United States Patent
Balakrishnan et al.

(10) Patent No.: US 7,668,247 B2
(45) Date of Patent: Feb. 23, 2010

(54) METHODS AND SYSTEMS FOR PERFORMING AN OVERLAP-AND-ADD OPERATION

(75) Inventors: Jaiganesh Balakrishnan, Karnataka (IN); Srinivas Lingam, Richardson, TX (US); Anuj Batra, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 558 days.

(21) Appl. No.: 11/331,463

(22) Filed: Jan. 13, 2006

(65) Prior Publication Data

US 2006/0159189 A1   Jul. 20, 2006

Related U.S. Application Data

(60) Provisional application No. 60/644,209, filed on Jan. 14, 2005.

(51) Int. Cl.
*H04K 1/10* (2006.01)

(52) U.S. Cl. .................. 375/260; 375/340; 375/355; 370/208; 370/210; 370/260

(58) Field of Classification Search ............... 375/260, 375/340, 355; 370/208, 210, 260
See application file for complete search history.

(56) References Cited

U.S. PATENT DOCUMENTS

| 5,596,607 | A * | 1/1997 | Larsson et al. ............... 375/340 |
| 5,914,987 | A | 6/1999 | Fogel |
| 6,269,132 | B1 * | 7/2001 | Yonge, III .................... 375/346 |
| 6,393,451 | B2 * | 5/2002 | Leyonhjelm et al. ......... 708/420 |
| 6,873,650 | B1 | 3/2005 | Banerjea et al. |
| 7,068,593 | B2 * | 6/2006 | Cho et al. .................... 375/260 |
| 2002/0191705 | A1 | 12/2002 | Melsa et al. |
| 2007/0291637 | A1 * | 12/2007 | Saitou ......................... 370/208 |
| 2008/0212693 | A1 * | 9/2008 | Razzell ....................... 375/260 |

* cited by examiner

*Primary Examiner*—Chieh M Fan
*Assistant Examiner*—Eva Y Puente
(74) *Attorney, Agent, or Firm*—Steven A. Shaw; W. James Brady; Frederick J. Telecky, Jr.

(57) ABSTRACT

A system is provided that includes a first device 110A that transmits an information symbol with a zero-padded suffix (ZPS) and a second device 110B that receives the information symbol with the zero-padded suffix. The second device 110B performs a Fourier transform on at least one sample of the information symbol before a ZPS sample is overlapped-and-added to another sample of the information symbol.

17 Claims, 5 Drawing Sheets

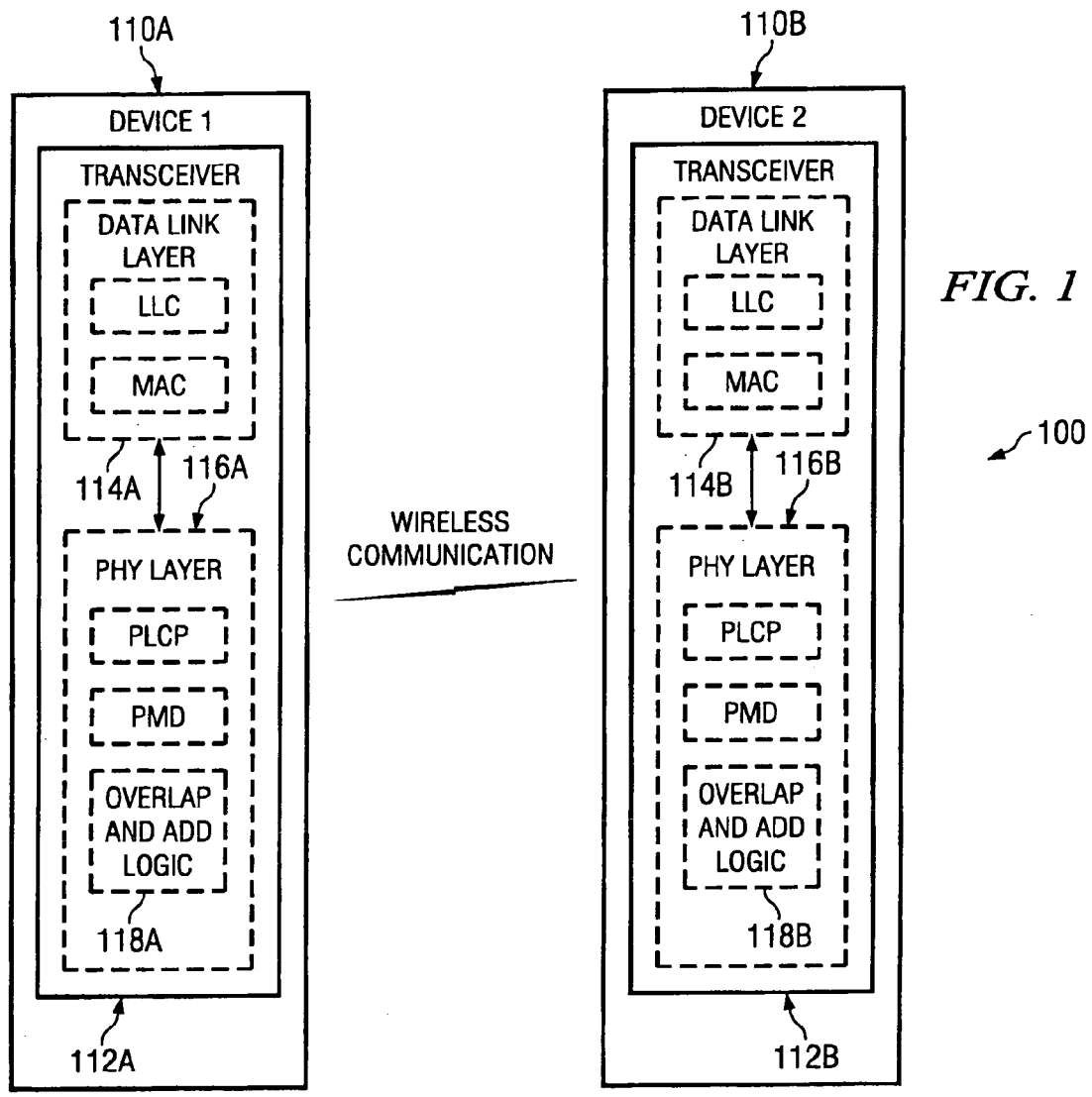
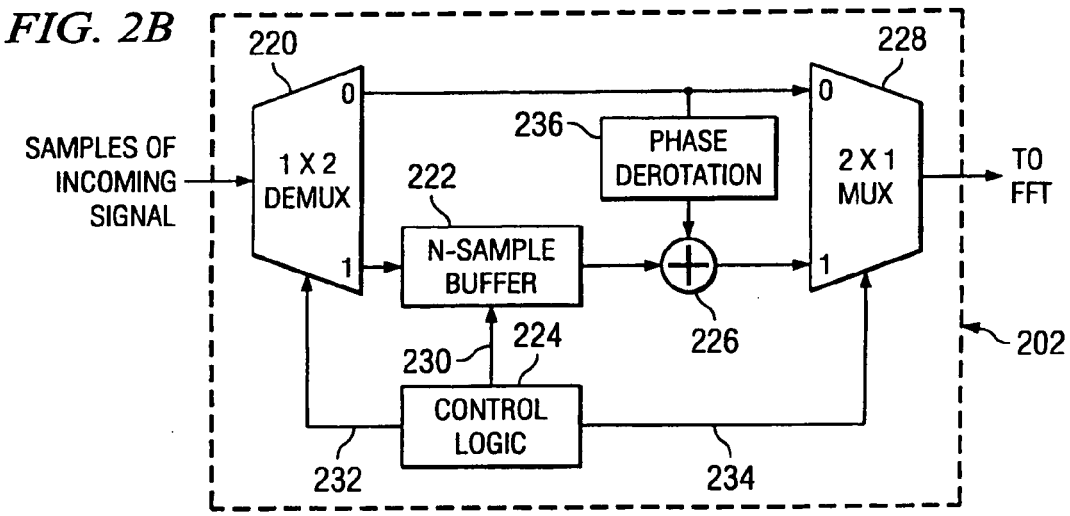

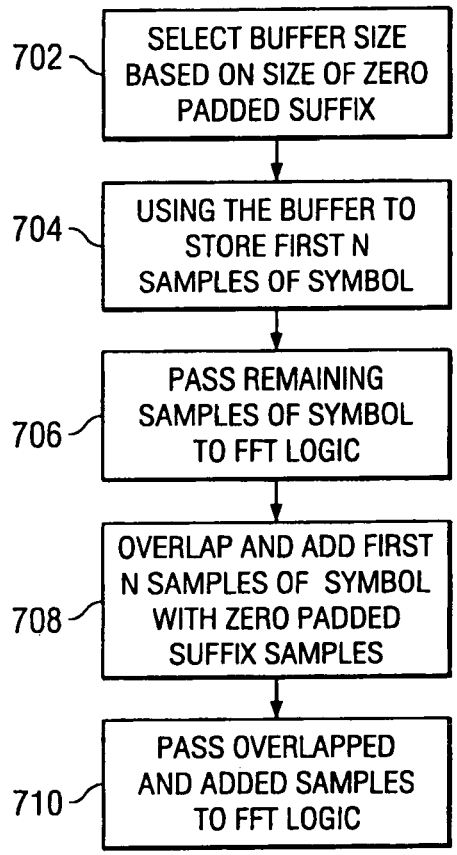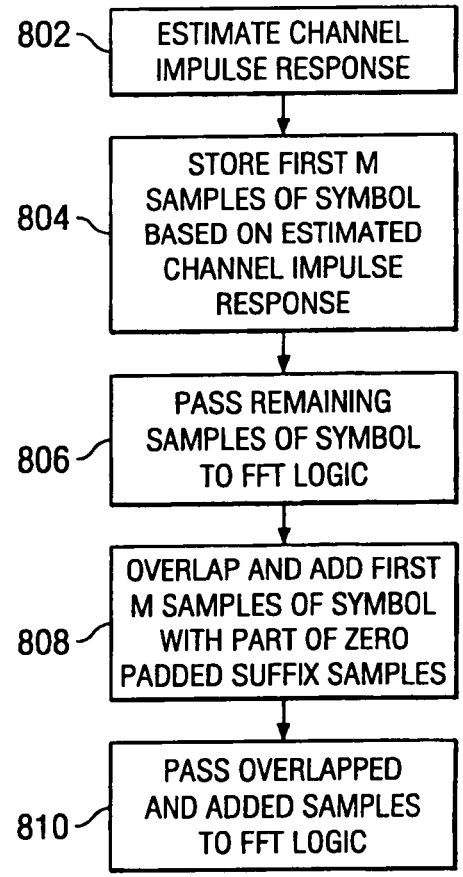

METHODS AND SYSTEMS FOR PERFORMING AN OVERLAP-AND-ADD OPERATION

CROSS-REFERENCE TO RELATED APPLICATIONS

This application is a non-provisional application claiming priority to U.S. Pat. App. Ser. No. 60/644,209, entitled "Reduced Latency Implementation of a Zero Padded Suffix Receiver for the Multi-band OFDM System", filed on Jan. 14, 2005. The above-referenced application is incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to communication systems, and more particularly, but not by way of limitation, to communication systems that overlap-and-add samples of an information symbol with samples of a zero-padded suffix.

BACKGROUND

In order for electronic devices to communicate, a wireless or wired protocol (i.e., standard) defines hardware and software parameters that enable the devices to send, receive, and interpret data. Frequency division multiplexing or frequency division modulation (FDM) is a technology that transmits multiple signals simultaneously over a single transmission path, such as a cable or wireless system. Each signal travels within its own unique frequency range (carrier), which is modulated by data (e.g., text, voice, video, etc.).

Orthogonal FDM (OFDM) distributes the data over a large number of carriers that are spaced apart at precise frequencies. To mitigate multi-path energy and to enable a transmitter and receiver to switch between different frequency bands. Some wired and wireless protocols define a guard interval that is placed before transmitted information symbols as a prefix. Other protocols define a guard interval that is placed after transmitted information symbols as a suffix (e.g., a zero-padded suffix or "ZPS"). In either case, the guard interval reduces interference between information symbols by providing time for multi-path reflections to attenuate.

When a ZPS is used (e.g., in a Multi-Band Orthogonal Frequency Division Modulation (OFDM) system), a receiving device may use an "overlap-and-add" operation to add samples of the ZPS to samples of the symbol preceding the ZPS. For example, the overlap-and-add operation may combine the "N" samples of the ZPS with the first N samples of the symbol preceding the ZPS. In some overlap-and-add operations, the entire symbol preceding the ZPS is buffered and the Fourier Transform logic of the receiving device is prevented from processing samples of the symbol until after the overlap-and-add begins. Accordingly, the overlap-and-add operation introduces undesirable latency at the receiving device.

SUMMARY

In at least some embodiments, a system comprises a first device that transmits an information symbol with a zero-padded suffix (ZPS) and a second device that receives the information symbol with the zero-padded suffix. The second device performs a Fourier transform on at least one sample of the information symbol before a ZPS sample is overlapped-and-added to another sample of the information symbol.

According to another embodiment, a receiver is provided that includes overlap-and-add logic and Fourier transform logic coupled to the overlap-and-add logic. The overlap-and-add logic outputs a cyclically shifted information symbol that is received by the Fourier transform logic.

According to other embodiments, a method is provided that includes storing an amount of information symbol samples for an overlap-and-add operation. The amount of information symbol samples is less than a total length of the information symbol. The method also includes forwarding at least one remaining information symbol sample for Fourier transform processing before forwarding an overlapped-and-added sample for Fourier transform processing.

BRIEF DESCRIPTION OF THE DRAWINGS

For a detailed description of various embodiments of the invention, reference will now be made to the accompanying drawings in which:

FIG. 1 illustrates a wireless system in accordance with embodiments of the disclosure;

FIG. 2B illustrates a block diagram of the overlap-and-add logic of FIG. 2A in accordance with embodiments of the disclosure;

FIG. 7 illustrates another method in accordance with alternative embodiments of the disclosure; and FIG. 8 illustrates another method in accordance with alternative embodiments of the disclosure.

NOTATION AND NOMENCLATURE

Figure 2A:
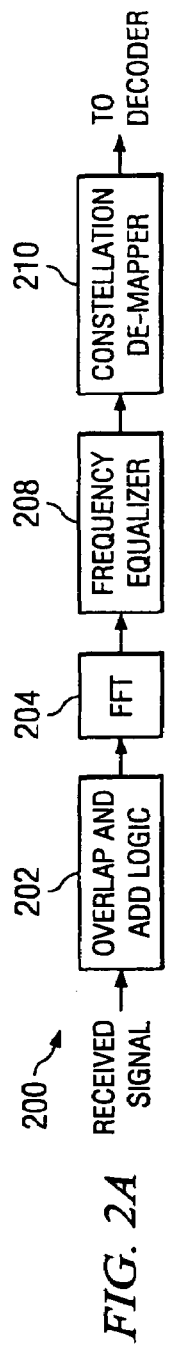
FIG. 2A illustrates a block diagram of a receiver in accordance with embodiments of the disclosure.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection

DETAILED DESCRIPTION

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

Electronic devices that communicate wirelessly (or via a wired connection) implement a variety of techniques to prepare, send, receive, and recover data. For example, data preparation techniques may include data scrambling, error correction coding, interleaving, data packet formatting, and/or other techniques. The data to be transmitted is converted into blocks of data (i.e., bits) transmitted as information symbols. Each information symbol is associated with a constellation of complex amplitudes.

If data communication is wireless, one or more antennas "pick up" the wireless signal, after which data is recovered by sampling the received signal and decoding each information symbol. To recover data, a receiving device may implement techniques such as signal amplification, digitization, sample rate conversion, equalization, demodulation, de-interleaving, de-coding, and/or de-scrambling.

In some communication systems such as a Multi-Band Orthogonal Frequency Division Modulation (OFDM) system, a zero-padded suffix (ZPS) follows each information symbol. Embodiments of the disclosure illustrate methods and systems that reduce latency introduced when an overlap-and-add operation is used with a ZPS. In at least some embodiments, this latency is reduced by cyclically shifting the order of samples input to a receiver's Fast Fourier Transform (FFT) logic (i.e., the FFT logic begins to receive some samples of the symbol preceding a ZPS before symbol samples are added to ZPS samples for the overlap-and-add operation). For example, in some embodiments, if the ZPS corresponds to "N" samples, only the first N samples of the symbol preceding the ZPS are buffered for the overlap-and-add operation. The remaining samples of the symbol are input to the receiver's FFT logic before ZPS samples are added to the buffered samples. The N samples corresponding to the ZPS are then overlapped-and-added to the first N samples (the buffered samples) of the symbol preceding the ZPS and the overlapped-and-added samples are input to the FFT logic.

Cyclically shifting symbols in the time-domain results in a linear phase shift in the frequency-domain. At the receiver, such a phase shift can be incorporated into the communication channel estimate and is compensated for by a receiver's frequency-domain equalizer. Accordingly, the cyclic shift enables a latency of the overlap-and-add operation to be reduced without affecting the performance of other system components.

FIG. 1 illustrates a system 100 in accordance with an embodiment of the disclosure. As shown in FIG. 1, the system 100 comprises the devices 110A and 110B. The device 110A includes a transceiver 112A having a data link layer 114A and a PHY layer 116A. Similarly, the device 110B includes a transceiver 112B having a data link layer 114B and a PHY layer 116B. In at least some embodiments, the data link layers and the PHY layers function according to a standardized communication protocol such as an 802.11 protocol. For clarity, only the components of the device 110A are described in greater detail. However, the same discussion would apply to the components of the device 110B.

In order for the device 110A to communicate wirelessly, the PHY layer 116A and the data link layer 114A perform several functions such as preparing, transmitting, receiving, and decoding wireless signals. In some embodiments, the PHY layer 116A implements a physical layer convergence procedure (PLCP) sub-layer, a physical medium dependent (PMD) sub-layer and overlap-and-add logic 118A.

The PLCP sub-layer of the device 110A enables carrier sense and clear channel assessment (CCA) signals to be provided to the data link layer 114A (indicating when the PHY layer 116A is in use). The PMD sub-layer of the PHY layer 116A provides encoding, decoding, modulation, and/or demodulation of information symbols for the device 110A. In some embodiments, the PMD sub-layer of the PHY layer 16A permits the device 110A to implement modulation techniques such as Multi-band OFDM. The PMD sub-layer also may provide functions such as analog-to-digital and/or digital-to-analog data conversion.

As shown, the data link layer 114A implements a logical link control (LLC) and a medium access control (MAC). During transmission of data, the LLC assembles data frames with address and cyclic redundancy check (CRC) fields. During reception of data, the LLC disassembles data frames, performs address recognition, and performs CRC validation. The MAC functions, at least in part, to coordinate transmission of data between the electronic device 110A and other devices (e.g., the device 110B).

The overlap-and-add logic 118A shown in FIG. 1 enables overlap-and-add operations to be performed. For example, in embodiments that implement Multi-band OFDM, overlap-and-add operations are performed (when data is received) to overlap-and-add samples of a zero-padded suffix (ZPS) and samples of an information symbol preceding the ZPS.

FIG. 2A illustrates a block diagram of a receiver 200 in accordance with embodiments of the disclosure. The receiver 200, for example, may be part of the PHY layer 116A previously described. As previously mentioned, the PHY layer 116A may be compatible with a multi-band OFDM physical layer specification. However, the receiver 200 is not limited to a particular protocol and may be part of any wired or wireless system that receives information symbols followed by a ZPS. The ZPS provides a mechanism to mitigate multi-path energy and enables a transmitter and receiver to switch between different frequency bands. As shown in FIG. 2A, the receiver 200 comprises overlap-and-add logic 202 that receives samples of an incoming signal. The overlap-and-add logic 202 selectively performs overlap-and-add operations and provides either the original (unmodified) incoming samples or the overlapped-and-added (modified) samples to the FFT logic 204. The overlap-and-add operations are part of a convolution process that uses the extra samples of the ZPS to form the desired output. In some embodiments, the FFT logic 204 receives at least some unmodified samples of the information symbol preceding a ZPS before any buffered symbol samples are added to the ZPS samples.

For example, if the ZPS corresponds to "N" samples, the first N samples of the symbol preceding the ZPS are buffered for the overlap-and-add operation. The remaining samples of the symbol (up to the ZPS) are input to the receiver's FFT logic 204 before the ZPS samples are added to the buffered samples. Thereafter, N ZPS samples are overlapped-andadded to the first N samples (the buffered samples) of the symbol preceding the ZPS and the overlapped-and-added samples are input to the FFT logic 204. In the above illustration, only N samples (corresponding to the size of the ZPS) are buffered for the overlap-and-add operation before the FFT logic 204 begins receiving information symbol samples from the overlap-and-add logic 202. This overlap-and-add method reduces latency and buffer size compared to overlap-and-add methods that buffer an entire information symbol before forwarding samples to a receiver's FFT logic. As an example, if a symbol corresponds to 128 samples and a ZPS corresponds to 32 samples, the latency of the overlap-and-add operation described in FIGS. 2A-2B (i.e., the number of clock cycles that the FFT logic 204 would be idle) is 32 clock cycles rather than 128 clock cycles (a reduction of 96 clock cycles).

The FFT logic 204 extracts frequency spectrum data from the incoming signal samples and outputs the frequency spectrum data to a frequency equalizer 208. The frequency equalizer 208 removes the frequency shaping caused by the communication channel and outputs "equalized" frequency spectrum data to a constellation de-mapper 210. If an information symbol's samples are cyclically shifted by the overlap-and-add logic 202 (i.e., if overlapped-and-added samples are input to the FFT logic 204 after the symbol's other samples), the frequency equalizer 208 compensates for this cyclic shift as if it were part of the communication channel frequency shape. The output of the frequency equalizer 208 is received by the constellation de-mapper 210, which converts the equalized frequency spectrum data to information symbols that can be decoded by a decoder.

FIG. 2B illustrates a block diagram of the overlap-and-add logic 202 of FIG. 2A in accordance with embodiments of the disclosure. As shown in FIG. 2B, the overlap-and-add logic 202 comprises a demultiplexer ("demux") 220 which may be a 1×2 demux (i.e., a single input is selectively routed to one of two possible output locations). The top output of the demux 220 is received by adding logic 226 after passing through phase derotation logic 236. The top output of the demux 220 is also received by a multiplexer ("mux") 228, which may be a 2×1 mux (i.e., one of two possible inputs is selectively routed as the mux output). The bottom output of the demux 220 is received by an N-sample buffer 222, which may be a first-in-first-out (FIFO) buffer.

In at least some embodiments, the size of the N-sample buffer 222 corresponds to the size of the ZPS. For example, if the ZPS is known to correspond to 32 complex samples (having I and Q components) and 8-bit samples are assumed for each sample component, an appropriate size for the N-sample buffer 222 would be 64 bytes (i.e., 32×2×8=64 bytes). Regardless of the buffer size, the buffered samples are provided to the adding logic 226 for the overlap-and-add operation and the output of the adding logic 226 is input to the mux 228. The mux 228 provides either the output of the demux 220 or the output of the adding logic 226 to FFT logic (e.g., FFT logic 204).

To perform overlap-and-add operations, the control logic 224 provides a demux control signal 232 to the demux 220, a buffer clock control signal 230 to the N-sample buffer 222 and a mux control signal 234 the mux 228. The demux control signal 232, the buffer clock control signal 230, and the mux control signal 234 are shown in greater detail in FIG. 3.

Figure 3:
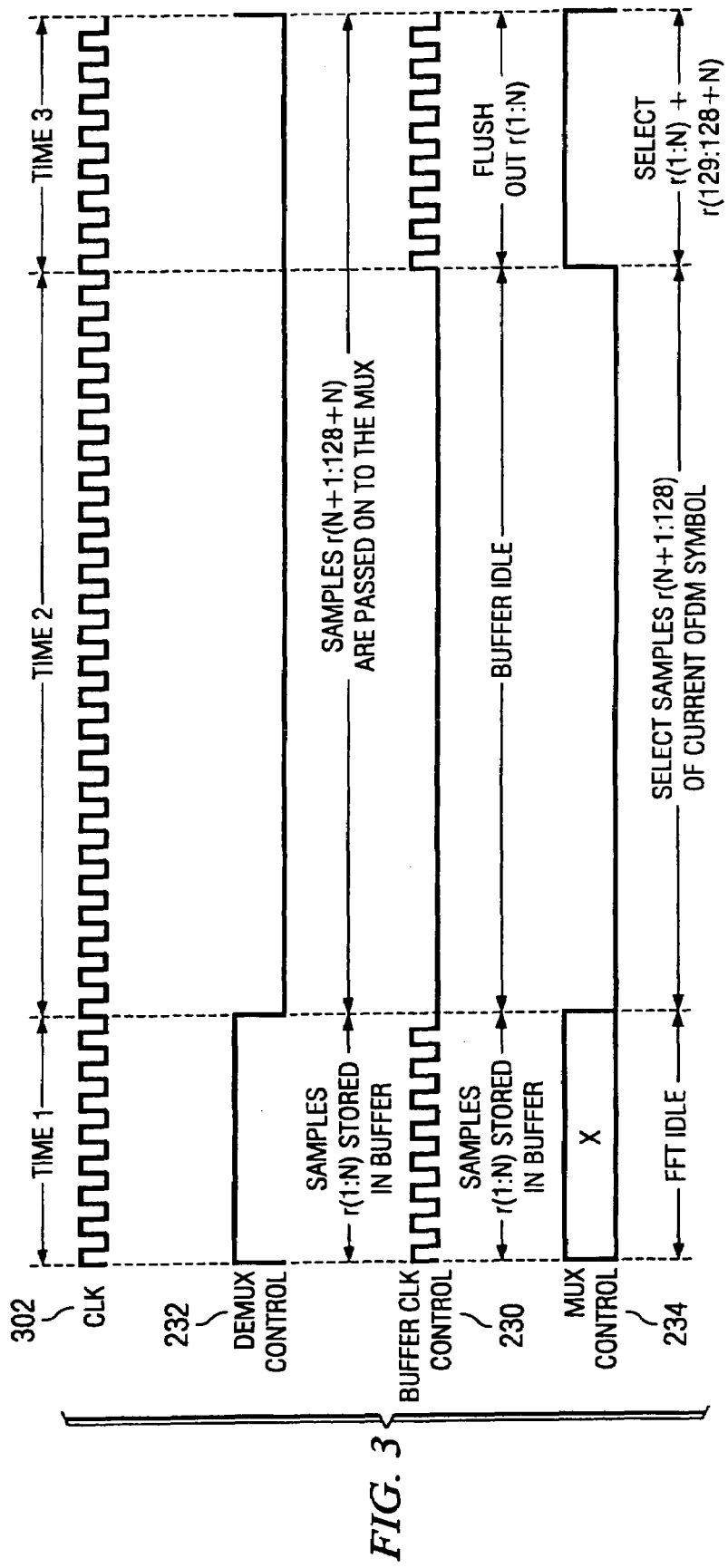
FIG. 3 illustrates timing diagrams associated with the overlap-and-add logic of FIG. 2B in accordance with embodiments of the disclosure.

FIG. 3 illustrates timing diagrams associated with the overlap-and-add logic 202 of FIG. 2B in accordance with embodiments of the disclosure. In FIG. 3, timing diagrams are provided for a clock signal 302, the demux control signal 232, the buffer clock control signal 230 and the mux control signal 234. The timing diagrams are divided into three time segments referred to as "TIME1", "TIME2" and "TIME3" and illustrate embodiments in which a ZPS corresponds to N samples. As shown, the information symbol preceding the ZPS corresponds to 128 samples. Embodiments, however, are not limited to information symbols corresponding to 128 samples.

As shown, the clock signal 302 may be set at a fixed frequency (e.g., 132 MHz) throughout the time periods (e.g., TIME1, TIME2, and TIME3) of an overlap-and-add operation. Each element of the overlap-and-add logic 202 (e.g., the demux 220, the N-sample buffer 222, the control logic 224, the adding logic 226, the phase derotation logic 236, and the mux 228) processes samples based on the frequency of the clock signal 302.

During TIME1, the control logic 224 directs the demux 220 to pass N samples to the N-sample buffer 222 by asserting the demux control signal 232 to a logical "1". The control logic 224 also activates the buffer clock control signal 230 so that the N samples are stored in the buffer 222. The N samples correspond to the first N samples of an information symbol. While the N samples are being buffered, the mux control signal 234 prevents the mux 228 from forwarding samples to the FFT logic 204 or the FFT logic 204 is otherwise prevented from processing samples.

During TIME2, the control logic 224 directs the demux 220 to pass the remaining samples of the information symbol (128-N remaining samples) to both the mux 228 and the phase derotation logic 236 by de-asserting the demux control signal 232 to a logical "0". The phase derotation logic 236 removes (or reduces) the affect of the phase offset between the samples to be added by the adding logic 226 (e.g., the samples to be added are separated by 128 samples in this case). This phase offset arises due to a frequency offset between the transmitting device and the receiving device. The control logic 224 also causes the N-sample buffer 222 to hold the N samples that were buffered during TIME1 by idling the buffer clock control signal 230. Finally, the control logic 224 causes the mux 228 to pass the symbol samples received from the demux 220 during TIME2 to the FFT logic 204 by de-asserting the mux control signal 234 to a logical "0".

During TIME3, the control logic 224 directs the demux 220 to pass ZPS samples to the mux 228 and to the phase derotation logic 236 by continuing to de-assert the demux control signal 232 to a logical "0". The control logic 224 also directs the N-sample buffer 222 to pass or "flush out" the buffered samples to the adding logic 226 by activating the buffer clock control signal 230. By providing the phase derotated ZPS samples and the buffered symbol samples to the adding logic 226, the overlap-and-add operation is performed. Finally, the control logic 224 directs the mux 228 to pass the overlapped-and-added samples from the adding logic 226 to the FFT logic 204 by asserting the mux control signal 234 to a logical "1".

Figure 4A:
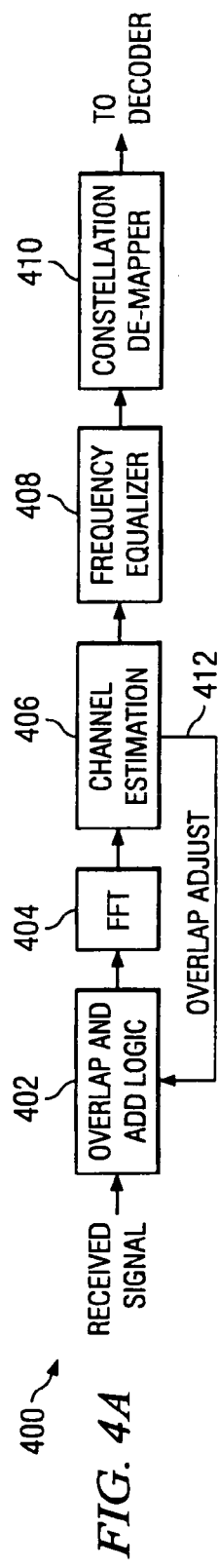
FIG. 4A illustrates a block diagram of a receiver in accordance with alternative embodiments of the disclosure.

FIG. 4A illustrates a block diagram of a receiver 400 in accordance with alternative embodiments of the disclosure. The receiver 400, for example, may be part of the PHY layer 116A previously described. As previously mentioned, the PHY layer 116A may be compatible with a multi-band OFDM physical layer specification. However, the receiver 200 is not limited to a particular protocol and may be part of any wired or wireless system that receives information symbols followed by a ZPS. The receiver 400 is similar to the receiver 200 previously described in FIG. 2A, but illustrates an embodiment that selects the number of samples that are buffered and added in the overlap-and-add operation according to an estimated channel impulse response (CIR) size rather than a ZPS size. In some embodiments, the receiver 400 dynamically estimates a CIR and adjusts the number of samples that are buffered and added in each overlap-and-add operation accordingly (e.g., the number of samples that are buffered may be a function of the estimated CIR).

As shown in FIG. 4A, the receiver 400 comprises overlap-and-add logic 402 that receives samples of an incoming signal. The overlap-and-add logic 402 selectively performs overlap-and-add operations and provides either the original (unmodified) samples or the overlapped-and-added (modified) samples to the FFT logic 404. In some embodiments, the FFT logic 404 receives at least some unmodified samples of the information symbol preceding a ZPS before the ZPS samples are added to the buffered samples by the overlap-and-add logic 402.

For example, if an estimated CIR corresponds to "M" samples, the first M samples of the symbol preceding the ZPS are buffered for the overlap-and-add operation. Alternatively, the value of M is simply a function of the estimated CIR and need not be exactly equal to the estimated CIR length. The remaining samples of the symbol (up to the ZPS) are input to the receiver's FFT logic 404 before the ZPS samples are added to the buffered samples. Thereafter, M ZPS samples are overlapped-and-added to the first M samples (the buffered samples) of the symbol preceding the ZPS and the overlapped-and-added samples are input to the FFT logic 404. In the above illustration, only M samples (corresponding to the size of the CIR or corresponding to some function based on the CIR size) are buffered for the overlap-and-add operation before the FFT logic 404 begins receiving information symbol samples from the overlap-and-add logic 402. Thus, the overlap-and-add latency is reduced compared to overlap-and-add methods that buffer all symbol samples for an overlap-and-add operation before forwarding samples to FFT logic. Assuming the CIR size is less than the ZPS size (i.e., the value of "M" is less than the value of "N"), the method of FIGS. 4A-4B also reduces overlap-and-add latency compared to the embodiments described in FIGS. 2A-2B.

Figure 4B:
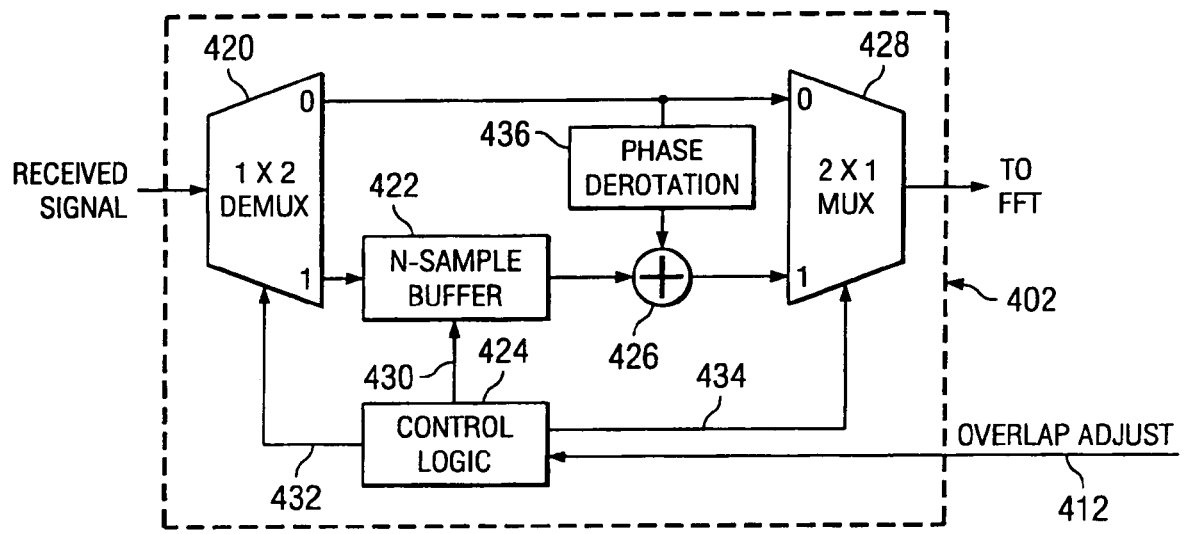
FIG. 4B illustrates a block diagram of the overlap-and-add logic of FIG. 4A in accordance with embodiments of the disclosure.

As an example, if an information symbol corresponds to 128 samples, a ZPS corresponds to 32 samples, and a CIR corresponds to 26 samples, the latency of the overlap-and-add operation of FIGS. 4A-4B (i.e., the number of clock cycles that the FFT logic 404 is idle per overlap-and-add operation) would be 26 clock cycles (if buffering is based on the CIR size) rather than 32 clock cycles (if buffering is based on the ZPS size) or 128 clock cycles (if buffering is based on the information symbol size). Alternatively, if the CIR corresponds to 26 samples, the latency of the overlap-and-add operation of FIGS. 4A-4B could be 28 clock cycles (based on a function that takes the CIR length into account, but does not buffer the exact number of samples corresponding to the CIR length). If the overlap-and-add operation is a function of the CIR size as in the embodiments of FIGS. 4A-4B, the buffer size may still be based on the ZPS size, which would represent the maximum CIR that the receiver 400 can account for.

In FIG. 4A, the FFT logic 404 extracts frequency spectrum data from the incoming signal samples and outputs the frequency spectrum data to channel estimation logic 406. The channel estimation logic 406 estimates a channel impulse response (CIR) that represents the effect a communication channel has on a signal transmitted through the channel.

In addition to estimating the CIR, the channel estimation logic 406 provides an overlap adjust signal 412 to the overlap-and-add logic 402, which may include the CIR or CIR-related information. The overlap adjust signal 412 enables the overlap-and-add logic 402 to adjust the number of samples that are buffered and added in each overlap-and-add operation based on the estimated CIR or a function of the estimated CIR. As channel span decreases, the CIR and, thus, the overlap adjust signal 412 would direct the overlap-and-add logic 402 to decrease the number of samples that are buffered and added (reducing latency) for an overlap-and-add operation. As channel span increases, the CIR and, thus, the overlap adjust signal 412 would direct the overlap-and-add logic 402 to increase the number of samples that are buffered and added (increasing latency) for an overlap-and-add operation.

In addition to estimating the CIR and providing the overlap adjust signal 412, the channel estimation logic 406 forwards the frequency spectrum data received from the FFT logic 404 to the frequency equalizer 408. The frequency equalizer 408 removes frequency response caused by the communication channel and outputs "equalized" frequency spectrum data to the constellation de-mapper 410. If an information symbol's samples are cyclically shifted by the overlap-and-add logic 402, the frequency equalizer 408 compensates for this cyclic shift as if it were part of the communication channel response. The output of the frequency equalizer 408 is received by a constellation de-mapper 410, which converts the equalized frequency spectrum data to information symbols that can be decoded by a decoder.

FIG. 4B illustrates a block diagram of the overlap-and-add logic 402 of FIG. 4A in accordance with embodiments of the disclosure. The overlap-and-add logic 402 of FIG. 4B functions similarly to the overlap-and-add logic 202 described in FIG. 2B, but performs the overlap-and-add operation as a function of the CIR size rather than the ZPS size. As shown in FIG. 4B, the overlap-and-add logic 402 comprises a demultiplexer ("demux") 420 which may be a 1×2 demux (i.e., a single input is selectively routed to one of two possible output locations). The top output of the demux 420 is received by adding logic 426 after passing through phase derotation logic 436. The top output of the demux 420 is also received by a multiplexer ("mux") 428, which may be a 2×1 mux (i.e., one of two possible inputs is selectively routed as the mux output). The bottom output of the demux 420 is received by an N-sample buffer 422, which may be a first-in-first-out (FIFO) buffer.

In at least some embodiments, the size of the N-sample buffer 422 corresponds to the size of the ZPS, which would represent the maximum CIR that the receiver 400 can account for. For example, if the ZPS is known to correspond to 32 complex samples (having I and Q components) and 8-bit samples are assumed for each sample component, an appropriate size for the N-sample buffer 422 would be 64 bytes (i.e., 32×2×8=64 bytes). Regardless of the buffer size, the buffered samples are provided to the adding logic 426 for the overlap-and-add operation and the output of the adding logic 426 is input to the mux 428. The mux 428 provides either the output of the demux 420 or the output of the adding logic 426 to FFT logic (e.g., FFT logic 404).

To perform overlap-and-add operations, the control logic 224 provides a demux control signal 432 to the demux 420, a buffer clock control signal 430 to the N-sample buffer 422 and a mux control signal 434 the mux 428. In at least some embodiments, the control logic 224 dynamically adjusts the timing of the demux control signal 432, the buffer clock control signal 430, and the mux control signal 434 based on the overlap adjust signal 412. In other words, the overlap adjust signal 412 causes the overlap-and-add logic 402 to select an amount ("M") of symbol samples to buffer as a function of the estimated CIR. The demux control signal 432, the buffer clock control signal 430, and the mux control signal 434 are shown in greater detail in FIG. 5.

Figure 5:
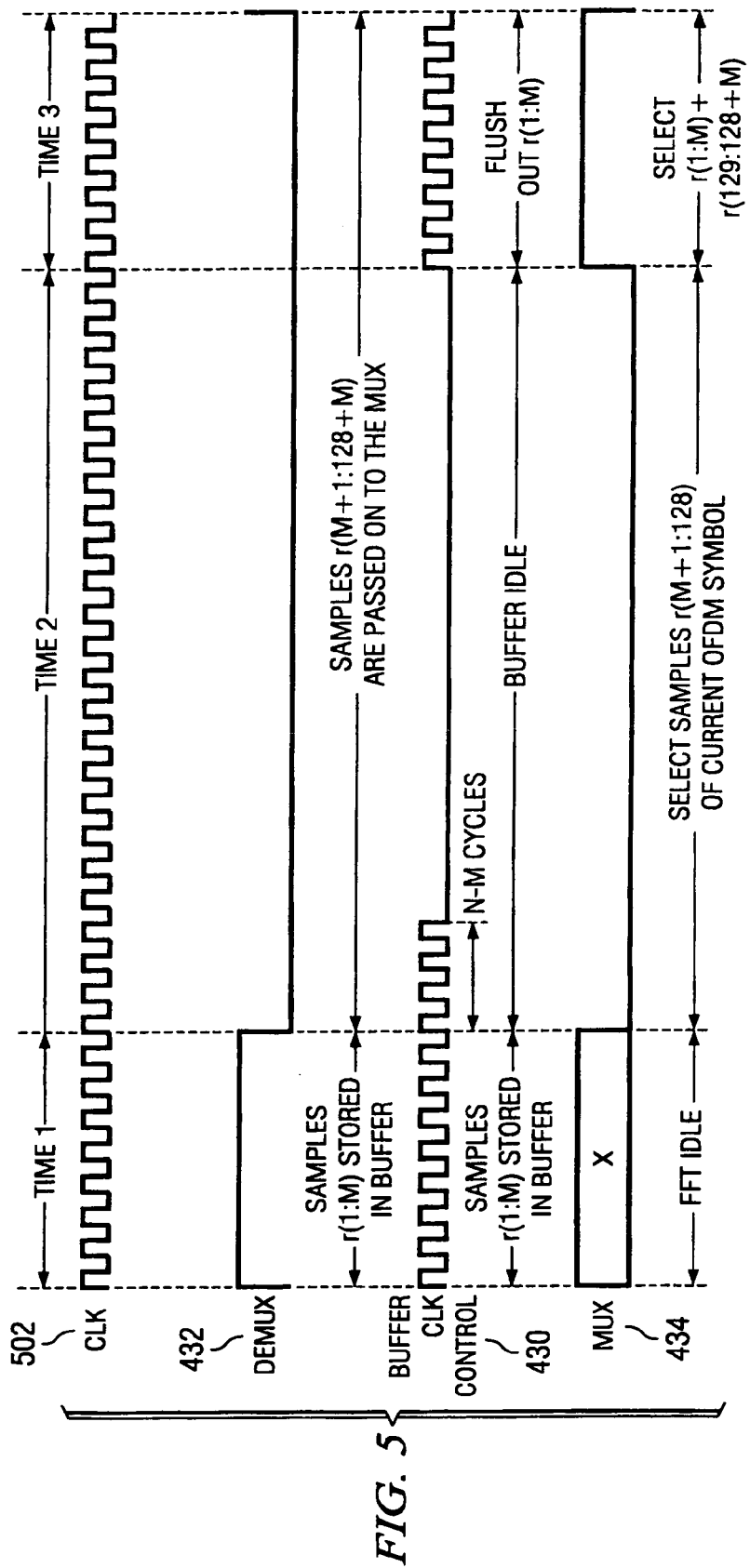
FIG. 5 illustrates timing diagrams associated with the overlap-and-add logic of FIG. 4B in accordance with embodiments of the disclosure.

FIG. 5 illustrates timing diagrams associated with the overlap-and-add logic 402 of FIG. 4B in accordance with embodiments of the disclosure. In FIG. 5, timing diagrams are provided for a clock signal 502, the demux control signal 432, the buffer clock control signal 430 and the mux control signal 434. The timing diagrams are divided into three time segments referred to as "TIME1", "TIME2" and "TIME3" and illustrate embodiments in which a CIR or CIR-based function corresponds to M samples and the information symbol preceding a ZPS corresponds to 128 samples. Embodiments, however, are not limited to information symbols corresponding to 128 samples.

As shown, the clock signal 502 may be set at a fixed frequency (e.g., 132 MHz) throughout the time periods (e.g., TIME1, TIME2, and TIME3) of an overlap-and-add operation. Each element of the overlap-and-add logic 402 (e.g., the demux 420, the N-sample buffer 422, the control logic 424, the adding logic 426, the phase derotation logic 436, and the mux 428) processes samples based on the frequency of the clock signal 402.

During TIME1, the control logic 424 directs the demux 420 to pass M samples to the N-sample buffer 422 by asserting the demux control signal 432 to a logical "1". The control logic 424 also activates the buffer clock control signal 430 so that the M samples are stored in the buffer 422. The M samples correspond to the first M samples of an information symbol. While the M samples are being buffered, the mux control signal 434 prevents the mux 428 from forwarding samples to the FFT logic 404 or the FFT logic 404 is otherwise prevented from processing samples.

During TIME2, the control logic 424 directs the demux 420 to pass the remaining samples of the information symbol (128-M remaining samples) to both the mux 428 and the phase derotation logic 436 by de-asserting the demux control signal 432 to a logical "0". The phase derotation logic 436 removes (or reduces) the affect of the phase offset between the samples to be added by the adding logic 426 (e.g., the samples to be added are separated by 128 samples in this case). Again, this phase offset arises due to a frequency offset between the transmitting device and the receiving device. The control logic 424 also causes the N-sample buffer 422 to store an additional N-M samples by clocking for N-M cycles, then idling the buffer clock control signal 430 until TIME 3. In this manner, the first M samples are ready to be flushed out. Finally, the control logic 424 causes the mux 428 to pass the symbol samples received from the demux 420 during TIME2 to the FFT logic 404 by de-asserting the mux control signal 434 to a logical During TIME3, the control logic 424 directs the demux 420 to pass ZPS samples to the mux 428 and to the phase derotation logic 236 by continuing to de-assert the demux control signal 432 to a logical "0". The control logic 424 also directs the N-sample buffer 422 to pass or "flush out" the M samples to the adding logic 426 by activating the buffer clock control signal 430. By providing the phase derotated ZPS samples and the buffered symbol samples to the adding logic 426, the overlap-and-add operation is performed. Finally, the control logic 424 directs the mux 428 to pass the overlapped-and-added samples from the adding logic 426 to the FFT logic 404 by asserting the mux control signal 434 to a logical "1".

Figure 6:
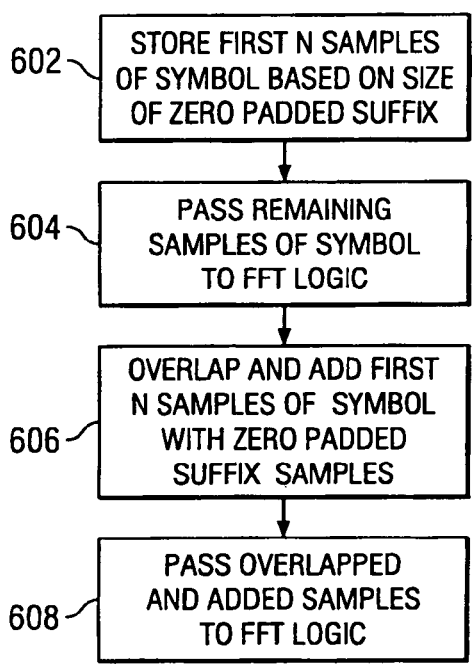
FIG. 6 illustrates a method in accordance with embodiments of the disclosure.

FIG. 6 illustrates a method 600 in accordance with embodiments of the disclosure. As shown in FIG. 6, the method 600 comprises storing the first N samples of a symbol based on the size of a ZPS (block 602). At block 604, the remaining samples of the symbol are passed to FFT logic. The first N samples of the symbol are overlapped-and-added with ZPS samples (block 606). Finally, the overlapped-and-added samples are passed to FFT logic (block 608).

FIG. 7 illustrates a method 700 in accordance with alternative embodiments of the disclosure. As shown in FIG. 7, the method 700 comprises selecting a buffer size of a buffer used in an overlap-and-add operation based on a ZPS size (block 702). At block 704, the buffer is used to store the first N samples of a symbol. The remaining samples of the symbol are then passed to FFT logic (block 706). At block 708, the first N samples of the symbol are overlapped-and-added with ZPS samples. Finally, the overlapped-and-added samples are passed to FFT logic (block 710).

FIG. 8 illustrates a method 800 in accordance with alternative embodiments of the disclosure. As shown in FIG. 8, the method 800 comprises estimating a channel impulse response (CIR) (block 802). At block 804, the first M samples of a symbol are stored based on the estimated CIR or a CIR-based function. The remaining samples of the symbol are passed to FFT logic (block 806). At block 808, the first M samples of the symbol are overlapped-and-added with ZPS samples. Finally, the overlapped-and-added samples are passed to FFT logic (block 810).

While several embodiments have been provided in the present disclosure, it should be understood that the disclosed systems and methods may be embodied in many other specific forms without departing from the spirit or scope of the present disclosure. For example, the embodiments herein could be implemented with a buffer that is based on the symbol size (e.g., a 128-sample buffer) rather than a buffer based on the ZPS size (e.g., a 32-sample buffer). In such case, the buffer would be clocked appropriately so that the first N samples or first M samples are ready to be provided to adding logic during TIME 3. For example, a 128-sample buffer could be clocked N times during TIME 1 and 128-N times during TIME 2 so that the first N samples are appropriately provided to the adding logic during TIME 3. Likewise, a 128-sample buffer could be clocked M times during TIME 1 and 128-M times during TIME 2 so that the first M samples are appropriately provided to the adding logic during TIME 3. The values for N and M would still be determined as previously described. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A system, comprising:
a first device that transmits an information symbol with a zero-padded suffix (ZPS); and
a second device that receives the information symbol with the zero-padded suffix,
said second device comprising:
overlap-and-add logic, comprising:
phase derotation logic;
adding logic coupled to the phase derotation logic, wherein the phase derotation logic reduces a phase offset of samples input to the adding logic;
Fourier transform logic;
wherein the second device performs a Fourier transform on at least one sample of the information symbol before a ZPS sample is overlapped-and-added to another sample of the information symbol, and wherein the overlap-and-add logic cyclically shifts samples of an information symbol provided to the Fourier transform logic.

2. The system of claim 1 wherein the overlap-and-add logic comprises a buffer having a size that corresponds to a ZPS size.

3. The system of claim 1 wherein the overlap-and-add logic buffers a portion of the information symbol for an overlap-and-add operation, the portion based on a ZPS size.

4. The system of claim 1 wherein the overlap-and-add logic buffers a portion of the information symbol for an overlap-and-add operation, the portion based on a channel impulse response (CIR) size.

5. The system of claim 1 wherein the second device further comprises channel estimation logic that estimates a channel impulse response (CIR) and provides a signal with CIR information to the overlap-and-add logic and wherein the overlap-and-add logic buffers a portion of the information symbol based on the CIR information.

6. A receiver, comprising:
overlap-and-add logic, wherein the overlap-and-add logic comprises an N-sample buffer, where N corresponds to a zero-padded suffix size and wherein the N-sample buffer stores N samples of the information symbol for an overlap-and-add operation; and
Fourier transform logic coupled to the overlap-and-add logic, wherein the overlap-and-add logic outputs a cyclically shifted information symbol that is received by the Fourier transform logic wherein, after the N samples are stored and before the N samples are added for the overlap-and-add operation, the overlap-and-add logic forwards a portion of information symbol samples to the Fourier transform logic.

7. The receiver of claim 6 wherein the N-sample buffer stores M samples of the information symbol for an overlap-and-add operation, where M is a function of a channel impulse response (CIR) size.

8. The receiver of claim 6 further comprising a frequency equalizer that compensates for the cyclically shifted information symbol.

9. A receiver, comprising:
overlap-and-add logic, wherein the overlap-and-add logic comprises an N-sample buffer, where N corresponds to a zero-padded suffix size; and
Fourier transform logic coupled to the overlap-and-add logic, wherein the overlap-and-add logic outputs a cyclically shifted information symbol that is received by the Fourier transform logic and wherein the N-sample buffer stores M samples of the information symbol for an overlap-and-add operation, where M is a function of a channel impulse response (CIR) size wherein, after the M samples are stored and before the M samples are added for the overlap-and-add operation, the overlap-and-add logic forwards a remaining portion of information symbol samples to the Fourier transform logic.

10. The receiver of claim 9 further comprising a frequency equalizer that compensates for the cyclically shifted information symbol.

11. A method, comprising:
storing, in a buffer, an amount of information symbol samples for an overlap-and-add operation, where the amount of information symbol samples is less than a total length of the information symbol, wherein the overlap-and-add operation is performed in a PHY layer of device in a communication system; and
forwarding at least one remaining information symbol sample for Fourier transform processing before performing the overlap-and-add operation and forwarding an overlapped-and-added sample for Fourier transform processing.

12. The method of claim 11 wherein the amount of information symbol samples corresponds to a size of a zero-padded suffix (ZPS) that follows the information symbol.

13. The method of claim 11 wherein the amount of information symbol samples is a function of an estimated channel impulse response size.

14. The method of claim 11 further comprising selecting a buffer size of the buffer used for the overlap-and-add operation based on a size of a zero-padded suffix.

15. The method of claim 11 further comprising estimating a channel impulse response for use with the overlap-and-add operation.

16. The method of claim 13 wherein forwarding at least one remaining sample of the information symbol for Fourier transform processing before forwarding an overlapped-and-added sample for Fourier transform processing comprises directing a demultiplexer control signal, to a demultiplexer, a buffer clock control signal, to the buffer, and a multiplexer control signal, to a multiplexer.

17. The method of claim 15 further comprising dynamically selecting the amount of information symbol samples stored for each of a plurality of information symbols based on the estimated channel impulse response.

* * * * *

UNITED STATES PATENT AND TRADEMARK OFFICE
CERTIFICATE OF CORRECTION

| | |
|---|---|
| PATENT NO. | : 7,668,247 B2 |
| APPLICATION NO. | : 11/331463 |
| DATED | : February 23, 2010 |
| INVENTOR(S) | : Balakrishnan et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 964 days.

Signed and Sealed this

Twenty-eighth Day of December, 2010

David J. Kappos
*Director of the United States Patent and Trademark Office*